United States Patent
Hyziak et al.

(10) Patent No.: US 6,801,571 B1
(45) Date of Patent: Oct. 5, 2004

(54) METHOD AND APPARATUS FOR OPTIMIZING DATA COMPRESSION IN A WIRELESS DIGITAL ACCESS SYSTEM

(75) Inventors: Janusz Hyziak, Des Plaines, IL (US); Shreesha Ramanna, Wheeling, IL (US); Jay P. Jayapalan, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 705 days.

(21) Appl. No.: 09/686,558

(22) Filed: Oct. 11, 2000

(51) Int. Cl.[7] .................................................. H04B 1/66
(52) U.S. Cl. ........................................................... 375/240
(58) Field of Search ................................ 375/222, 240; 455/422

(56) References Cited

U.S. PATENT DOCUMENTS

| | | | | |
|---|---|---|---|---|
| 5,131,016 A | * | 7/1992 | Broughton et al. | 375/240 |
| 5,410,754 A | * | 4/1995 | Klotzbach et al. | 370/466 |
| 5,758,256 A | * | 5/1998 | Berry et al. | 455/72 |
| 5,809,066 A | * | 9/1998 | Suomi et al. | 375/222 |
| 5,862,142 A | * | 1/1999 | Takiyasu et al. | 370/480 |
| 5,911,120 A | * | 6/1999 | Jarett et al. | 455/417 |
| 5,920,402 A | * | 7/1999 | Scott | 358/405 |
| 6,128,505 A | * | 10/2000 | Sipila | 455/465 |
| 6,205,173 B1 | * | 3/2001 | Obradors et al. | 375/240 |
| 6,246,754 B1 | * | 6/2001 | Cole et al. | 379/93.29 |
| 6,324,515 B1 | * | 11/2001 | Rabipour et al. | 704/500 |
| 6,366,609 B1 | * | 4/2002 | Rossi | 375/222 |
| 6,415,329 B1 | * | 7/2002 | Gelman et al. | 709/245 |
| 6,597,674 B1 | * | 7/2003 | Obuchi et al. | 370/331 |
| 2002/0009136 A1 | * | 1/2002 | Heath | 375/240 |

FOREIGN PATENT DOCUMENTS

WO    WO 9927691 A1 * 6/1999 ........... H04L/29/06

* cited by examiner

Primary Examiner—Stephen Chin
Assistant Examiner—Harry Vartanian (57) ABSTRACT

A method and apparatus for optimizing data compression in a wireless digital access system (606) is described. The capability to establish a data compression session (216) spanning two communication links (604 and 605) is provided. Common compression parameters compatible with both communication links (604 and 605) are coordinated. Unnecessary processing is avoided, thereby reducing the processing load of a control processor (204) used in conjunction with the invention.

20 Claims, 7 Drawing Sheets

-PRIOR ART-

METHOD AND APPARATUS FOR OPTIMIZING DATA COMPRESSION IN A WIRELESS DIGITAL ACCESS SYSTEM

TECHNICAL FIELD OF THE INVENTION

The invention relates generally to wireless digital access systems and, more specifically, to data compression for wireless digital access systems.

BACKGROUND OF THE INVENTION

In the past, data compression techniques, for example such techniques as those described in ITU CCITT Recommendation V.42 bis, which is incorporated by reference into the present application, were applied between two modems to increase throughput between the two modems. Even with the recent growth in wireless communications, the existing paradigm has been maintained as illustrated in FIG. 1.

Figure 1:
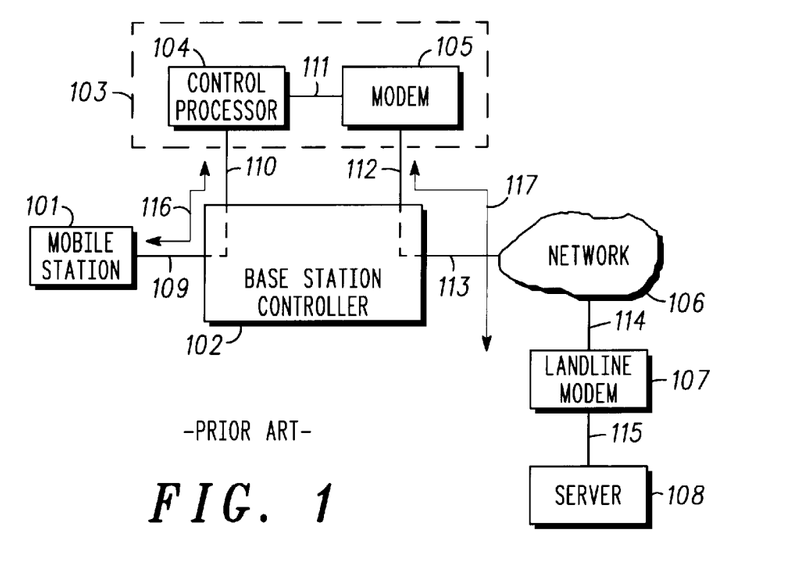
FIG. 1 is a block diagram illustrating a system of the prior art for providing communication using data compression.

FIG. 1 is a block diagram illustrating a system of the prior art for providing communication using data compression. Mobile station 101 is coupled via radio frequency (RF) communication link 109 to base station controller 102. Base station controller 102 is coupled via coupling 110 to control processor 104 of interworking unit (IWU) 103. Control processor 104 is coupled via coupling 111 to modem 105 of IWU 103. Modem 105 is coupled via coupling 112 to base station controller 102. Base station controller 102 is coupled via coupling 113 to network 106. Network 106 is coupled via coupling 114 to landline modem 107. Landline modem 107 is coupled via coupling 115 to server 108.

A data compression session is established between landline modem 107 and modem 105 of IWU 103. A separate data compression session utilizing different compression parameters is established between mobile station 101 and control processor 104 of IWU 103. Thus, control processor 104 is required to perform computationally intensive data compression and decompression of the data being communicated with mobile station 101. A control processor 104 is typically coupled to approximately 20 modems 105. Consequently, control processor 104 may be burdened not only with the computationally intensive data compression and decompression for one mobile station 101, but potentially with the data compression and decompression for approximately 20 mobile stations 101. Such conditions can easily overwhelm the available processing power of control processor 104. While simple point-to-point communication systems have benefited from data compression in the past, more complex systems, such as that illustrated in FIG. 1, have not been able to achieve the same level of performance. There has been a long-felt, but unsatisfied, need to provide a technique capable of providing substantial improvements in performance to such more complex systems. Thus, a method and apparatus for optimizing data compression in a wireless digital access system is needed.

DETAILED DESCRIPTION OF A PREFERRED EMBODIMENT

A method and apparatus for optimizing data compression in a wireless digital access system is described. The capability to establish a data compression session spanning two communication links is provided. Common compression parameters compatible with both communication links are coordinated. Unnecessary processing is avoided, thereby reducing the processing loads of processors used in conjunction with the invention.

Figure 2:
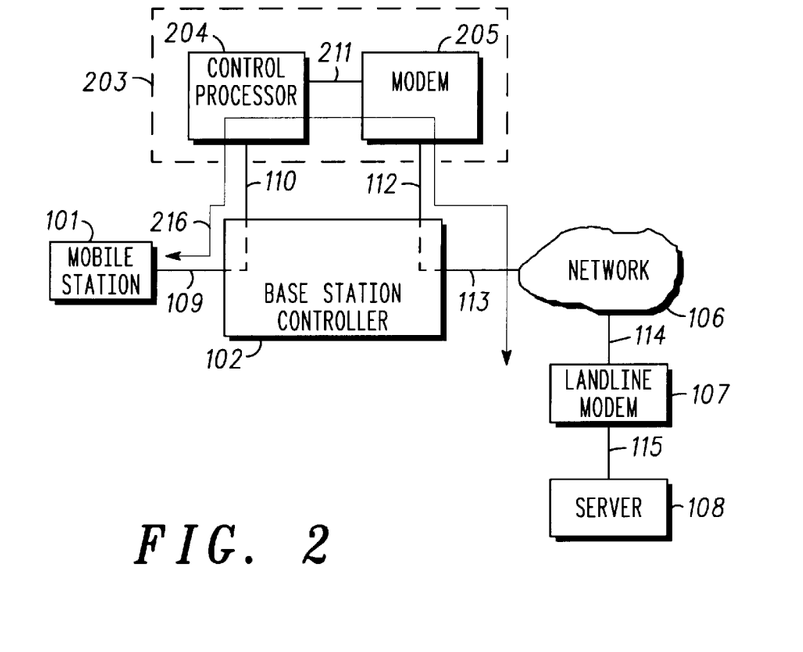
FIG. 2 is a block diagram illustrating a system for providing communication using data compression in accordance with an embodiment of the invention.

FIG. 2 is a block diagram illustrating a system for providing communication using data compression in accordance with an embodiment of the invention. Mobile station 101 is coupled via radio frequency (RF) communication link 109 to base station controller 102. While mobile station 101 may actually be mobile station, in accordance with various embodiments of the invention, mobile station 101 may alternatively be any type of station coupled by a wireless link. Base station controller 102 is coupled via coupling 110 to control processor 204 of interworking unit (IWU) 203. Control processor 204 is coupled via coupling 211 to modem 205 of IWU 203. Modem 205 is coupled via coupling 112 to base station controller 102. Base station controller 102 is coupled via coupling 113 to network 106. Network 106 is coupled via coupling 114 to landline modem 107. Landline modem 107 is coupled via coupling 115 to server 108.

A data compression session 216 is established spanning the entire path from mobile station 101 to landline modem 107. Control processor 204 is relieved from having to perform data compression and decompression on data communicated with mobile station 101.

Figure 3:
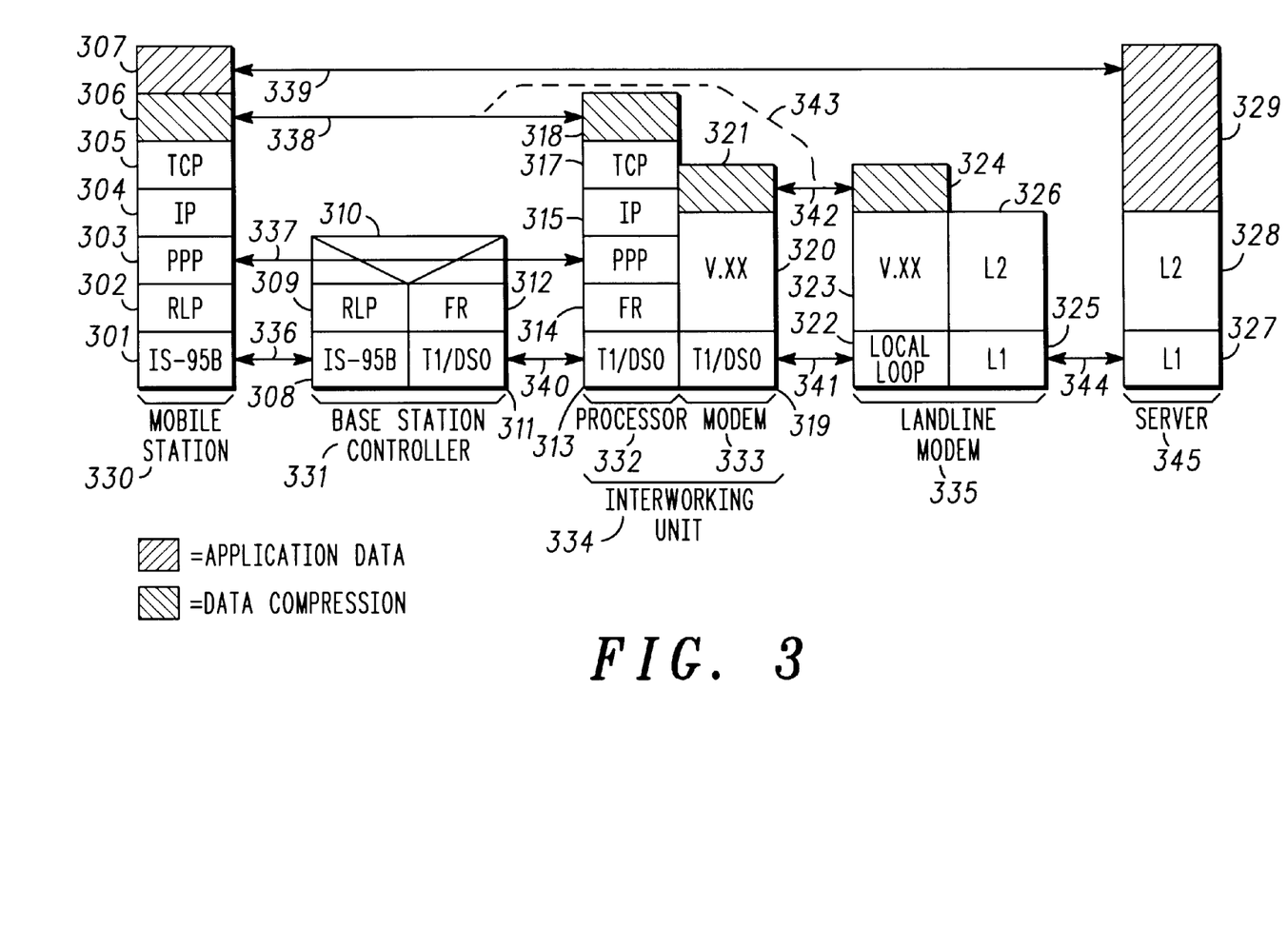
FIG. 3 is a communication stack diagram illustrating examples of stacks of a mobile station, a base station controller, an interworking unit, a landline modem, and a server in accordance with an embodiment of the invention.

FIG. 3 is a communication stack diagram illustrating examples of stacks of a mobile station, a base station controller, an interworking unit, a landline modem, and a server in accordance with an embodiment of the invention. The stacks denote the hierarchy of levels of communications protocols implemented in each component of the system. For example, the stack 330 for mobile station 101 includes IS-95B protocol 301 at the lowest level. Above IS-95B protocol 301 is radio link protocol (RLP) 302. Above RLP 302 is point-to-point protocol (PPP) 303. Above PPP 303 is internet protocol (IP) 304. Above IP 304 is transfer control program (TCP) protocol 305. Above TCP protocol 305 is data compression layer 306. Above data compression layer 306 is application data layer 307.

Base station controller 102 uses a dual stack 331, with the left side used for communication with mobile station 101 and the right side used for communication with IWU 203. The left side includes the IS-95B protocol 308 at its lowest level. Above IS-95B protocol 308 is RLP 309. Above RLP 309 is a layer 310 that passes PPP communications between mobile station 101 and IWU 203. The right side includes a T1/DS0 protocol 311 at the lowest level. Above the T1/DS0 protocol 311 is frame relay (FR) protocol 312. Layer 310 lies above FR protocol 312.

IWU 203 uses a dual stack 334, with the left side 332 used for communication with base station controller 102 and the right side 333 used for communication with landline modem 107. The left side 332 is implemented in control processor 204, and the right side 333 is implemented in modem 205. The left side 332 includes a T1/DS0 protocol 313 at its lowest level. Above the T1/DS0 protocol 313 is FR protocol 314. Above FR protocol 314 is PPP 315. Above PPP 315 is IP 316. Above IP 316 is TCP protocol 317. Above TCP protocol 317 is data compression layer 318. The right side 333 includes T1/DS0 protocol 319 at its lowest level. Above T1/DS0 protocol 319 is V.XX protocol 320, which may, for example, be a V.32 protocol. Above the V.XX protocol 320 is data compression layer 321.

Landline modem 107 uses a dual stack 335, with the left side used for communication with IWU 203. The left side includes a local loop protocol 322 at its lowest level. Above local loop protocol 322 is V.XX protocol 323. Above V.XX protocol 323 is data compression layer 324. The right side of the dual stack 335 includes a lower level protocol 325 and a higher level protocol 326.

Stack 345 of the server 108 includes lower level protocol 327 at its lowest level. Above lower level protocol 327 is higher level protocol 328. Above higher level protocol 328 is application data layer 329.

The IS-95B protocol 301 of mobile station 101 communicates with the IS-95B protocol 308 of base station controller 102 via connection 336. The T1/DS0 protocol 311 of base station controller 102 communicates with the T1/DS0 protocol 313 of internetworking unit 203 via connection 340. These connections facilitate communication from mobile station 101 to internetworking unit 203 through base station controller 102 via connection 337 through layer 310, as well as data compression from mobile station 101 to internetworking unit 203 via connection 338.

The T1/DS0 protocol 319 of internetworking unit 203 communicates with the local loop protocol 322 of landline modem 107 via connection 341. Data is compressed by data compression layer 321 and modulated by V.XX protocol 320 and carried over connection 341 to be demodulated by V.XX protocol 323 and decompressed by data compression layer 324. Connection 342 represents a peer-to-peer connection between data compression layers 321 and 324, which may, for example, be V.42 bis compression/decompression layers in their respective stacks. The lower level protocol 325 of the right side of dual stack 335 communicates with the lower level protocol 327 of stack 345 via connection 344.

Connections 336, 340, 341, and 344 facilitate communication of application data between mobile station 101 and server 108 via logical connection 339. However, while in the past, two different data compression sessions (one along connection 338 and another along connection 342) were required for communication between mobile station 101 and landline modem 107, one embodiment of the invention provides an end-to-end data compression session using common compression parameters along connection 343, which extends from mobile station 101 to landline modem 107. Thus, the complexity of supporting data compression layers 318 and 321 in dual stack 334 of internetworking unit 203 is avoided.

While FIG. 3 has been described with respect to particular protocols (such as IS-95B, T1/DS0, RLP, FR, PPP, IP, and TCP) between particular types of system components (such as mobile station 101 and landline modem 107), it is understood that the present invention is not limited to the configuration shown in FIG. 3, but may be practiced in various embodiments using any suitable protocols between any suitable system components.

Figure 4:
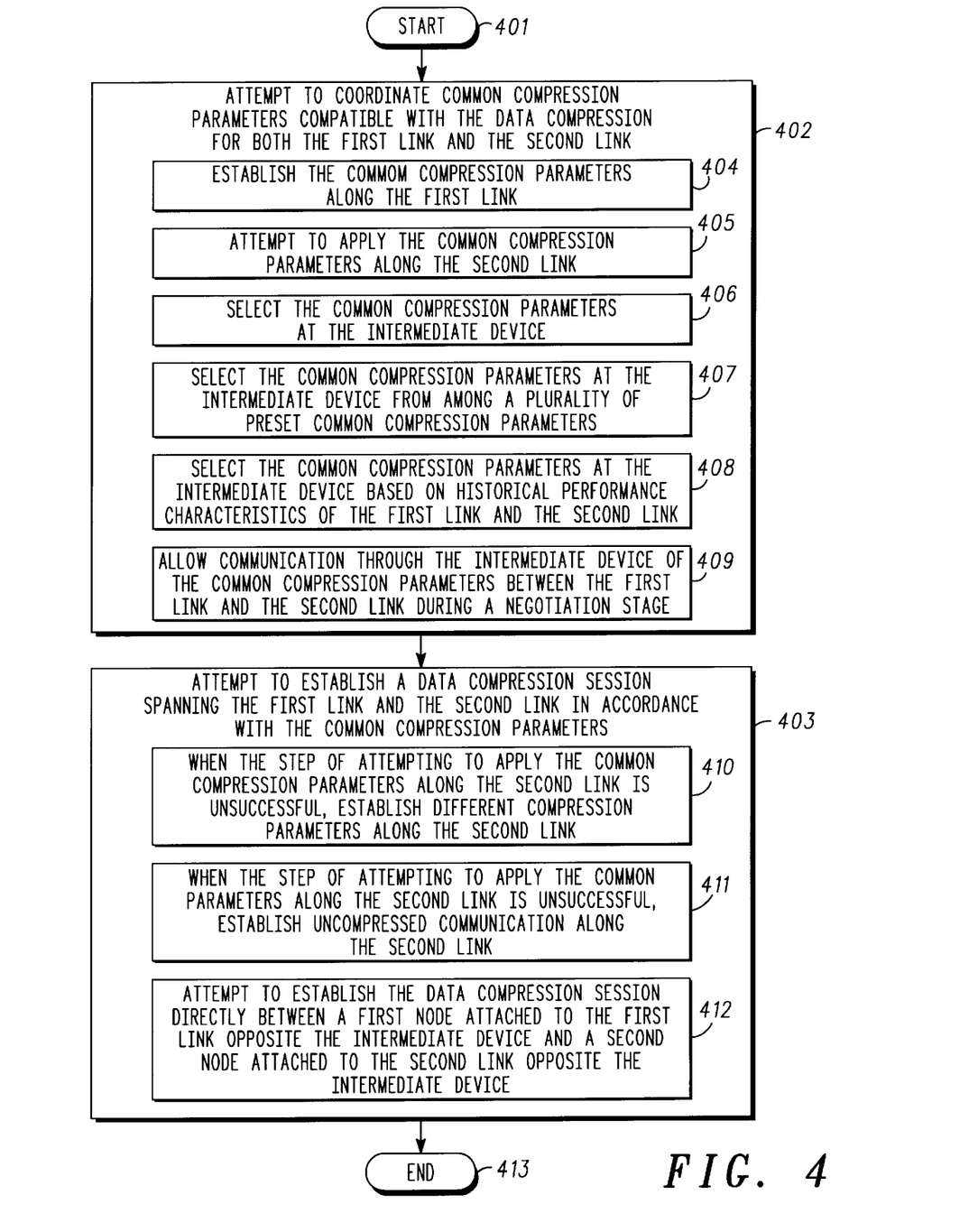
FIG. 4 is a flow diagram illustrating a method in accordance with an embodiment of the invention.

FIG. 4 is a flow diagram illustrating a method in accordance with an embodiment of the invention. The method is useful for optimizing data compression in a wireless digital access system comprising a first link and a second link joined by an intermediate device. The method begins in step 401. In step 402, an attempt is made to coordinate common compression parameters compatible with the data compression for both the first link and the second link. Step 402 may include steps 404, 405, and at least one of steps 406, 407, 408, and/or 409. In step 404, the common compression parameters are established along the first link. In step 405, an attempt is made to apply the common compression parameters along the second link. If the attempt of step 405 is successful, the method may continue to step 403. If the attempt of step 405 is unsuccessful, other alternatives described herein may be chosen. In step 406, the common compression parameters are selected at the intermediate device. In step 407, the common compression parameters are selected at the intermediate device from among a plurality of preset common compression parameters. In step 408, the common compression parameters are selected at the intermediate device based on historical performance characteristics of the first link and the second link. In step 409, communication of the common compression parameters between the first link and the second link during a negotiation stage is allowed through the intermediate device.

This method may be practiced with various types of links. For example, the first link and the second link may be landline links, wireless links, or other types of links, in any combination. A wireless link may use any suitable modulation technique, for example, code division multiple access (CDMA).

The attempt of step 402 may be either successful or unsuccessful. If the attempt is successful, the method may continue to step 403. If the attempt is unsuccessful, other alternatives, such as those described with reference to steps 410 and 411 may be chosen.

In step 403, an attempt is made to establish a data compression session spanning the first link and the second link in accordance with the common compression parameters. Step 403 may include steps 410, 411, and/or 412. In step 410, when the step of attempting to apply the common compression parameters along the second link is unsuccessful, different compression parameters are established along the second link. This method may be practiced with various types of links as described above.

In step 411, when the step of attempting to apply the common parameters along the second link is unsuccessful, uncompressed communication is established along the second link. This method may be practiced with various types of links as described above.

In step 412, an attempt is made to establish the data compression session directly between a first node attached to the first link opposite the intermediate device and a second node attached to the second link opposite the intermediate device. The attempt may be successful or unsuccessful. If it is successful, the data compression session is established directly between the first node and the second node. If it is not successful, other configurations described herein may be attempted. In step 413, the method ends.

Figure 5:
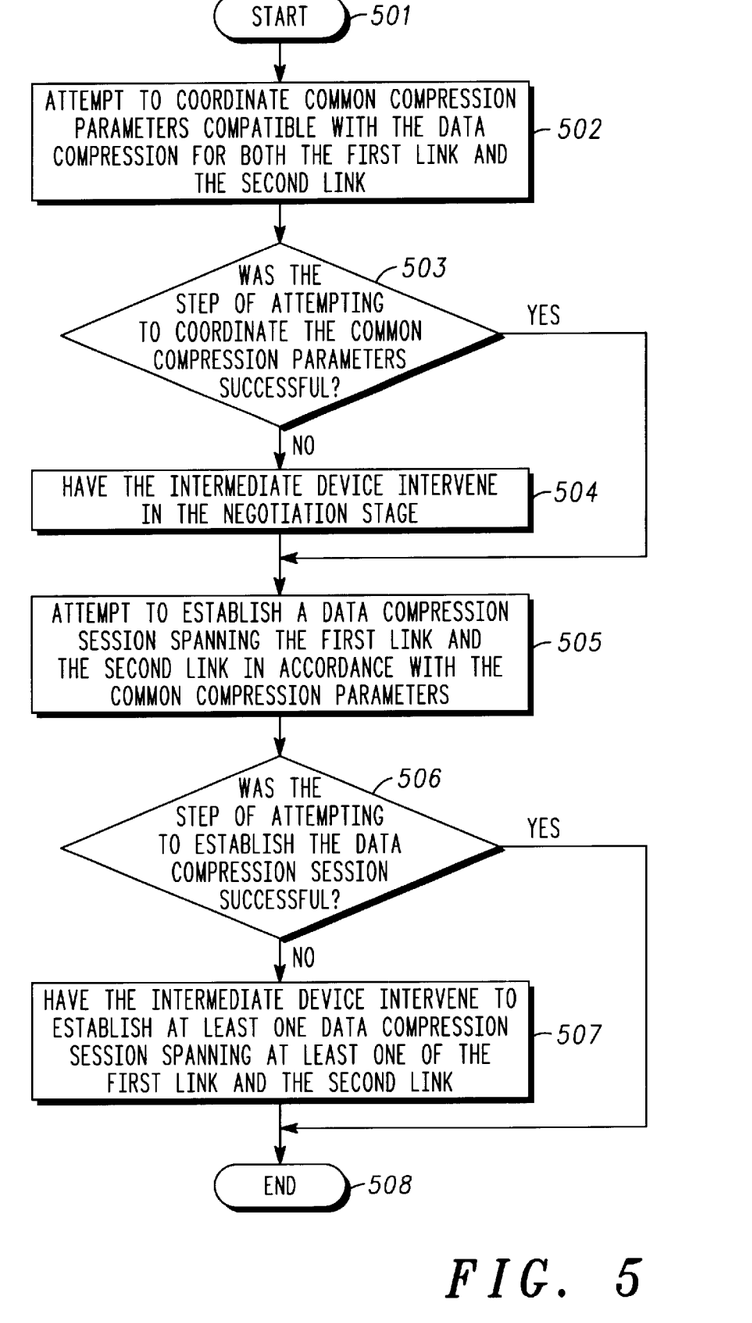
FIG. 5 is a flow diagram illustrating a method in accordance with an embodiment of the invention.

FIG. 5 is a flow diagram illustrating a method in accordance with an embodiment of the invention. The method begins in step 501. In step 502, an attempt is made to coordinate common compression parameters compatible with the data compression for both the first link and the second link. In step 503, a determination is made as to whether or not the attempt of step 502 was successful. If it was successful, the method continues to step 505. If it was not successful, the method continues to step 504.

In step 504, the intermediate device intervenes in the negotiation stage. In step 505, an attempt is made to establish a data compression session spanning the first link and the second link in accordance with the common compression parameters. In step 506, a determination is made as to whether or not the attempt of step 505 was successful. If the attempt was successful, the method continues to step 508. If the attempt was not successful, the method continues to step 507. In step 507, the intermediate device intervenes to establish at least one data compression session spanning at least one of the first link and second link. The method ends in step 508.

Figure 6:
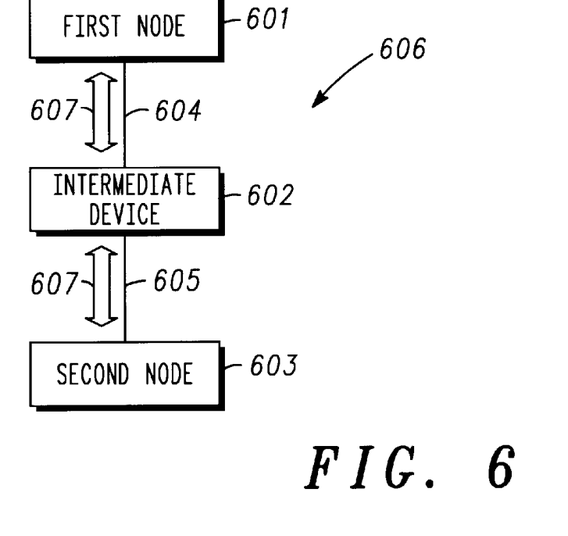
FIG. 6 is a block diagram illustrating a system in accordance with an embodiment of the invention.

FIG. 6 is a block diagram illustrating a system in accordance with an embodiment of the invention. The system is a wireless digital access system 606 for optimizing data compression. The system includes a first link 604 capable of supporting the data compression, a second link 605 capable of supporting the data compression, and an intermediate device 602 operably coupled to the first link 604 and the second link 605 to attempt to coordinate common compression parameters 607 compatible with the data compression for both the first link 604 and the second link 605 and to attempt to establish a data compression session spanning the first link 604 and the second link 605 in accordance with the common compression parameters 607.

In one embodiment of the system, the intermediate device 602 attempts to apply the common compression parameters 607 along the second link 605 after the common compression parameters 607 have been established along the first link 604. The system may be practiced with various types of links for the first link 604 and the second link 605, as described herein.

In one embodiment of the invention, the intermediate device 602 selects the common compression parameters 607. Optionally, the intermediate device 602 selects the common compression parameters 607 from among a plurality of preset common compression parameters. It is also possible for the intermediate device 602 to select the common compression parameters 607 based on historical performance characteristics of the first communication link 604 and the second communication link 605. It is further possible for the intermediate device 602 to communicate the common compression parameters 607 between the first communication link 604 and the second communication link 605 during a negotiation stage.

The intermediate device 602 may attempt to establish the data compression session directly between a first node 601 attached to the first communication link 604 opposite the intermediate device 602 and a second node 603 attached to the second communication link 605 opposite the intermediate device 602. This attempt may be either successful or unsuccessful. If the attempt is successful, the data compression session is established directly between the first node 601 and the second node 603. When coordination of the common compression parameters 607 is unsuccessful, the intermediate device 602 may intervene in the negotiation stage. As another alternative, when establishment of the data compression session is unsuccessful, the intermediate device 602 intervenes to establish at least one data compression session spanning at least one of the first communication link 604 and the second communication link 605.

Figure 7:
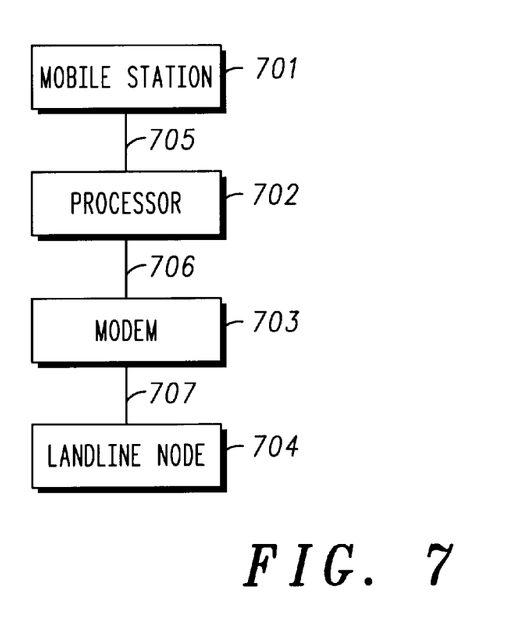
FIG. 7 is a block diagram illustrating an apparatus in accordance with an embodiment of the invention.

FIG. 7 is a block diagram illustrating an apparatus in accordance with an embodiment of the invention. The apparatus is useful for optimizing data compression. The apparatus may include a modem 703 operably coupled to a landline link 707 and a processor 702 operably coupled to the modem 703 via connection 706 and to a wireless link 705. Connection 706 may be implemented as a high-speed link that may communicate data in compressed or uncompressed form without constraining overall end-to-end bandwidth. Alternatively, connection 706 may be omitted if processor 702 and modem 703 are integrally coupled. The processor 702 attempts to coordinate common compression parameters for providing a data compression session spanning the wireless link 705 and the landline link 707.

The processor 702 may attempt to apply the common compression parameters along the wireless link 705 after the common compression parameters have been established along the landline link 707. Alternatively, the processor 702 may attempt to have the modem 703 apply the common compression parameters along the landline link 707 after the common compression parameters have been established along the wireless link 705. Optionally, the processor 702 may select the common compression parameters. For example, the processor 702 may select the common compression parameters from among a plurality of preset common compression parameters. Optionally, the processor 702 may select the common compression parameters based on historical performance characteristics of the landline link 707 and the wireless link 705.

In one embodiment of the apparatus, the processor 702 communicates the common compression parameters between the landline link 707 and the wireless link 705 during a negotiation stage. Optionally, the processor 702 attempts to establish the data compression session directly between a landline node 704 coupled to the landline link 707 and a mobile station 701 coupled to the wireless link 705. When the processor 702 is successful, the processor 702 coordinates the common compression parameters and establishes the data compression session. When coordination of the common compression parameters is unsuccessful, the processor 702 intervenes in the negotiation stage. Alternatively, when establishment of the data compression session is unsuccessful, the processor 702 intervenes to establish at least one data compression session spanning at least one of the landline link 707 and the wireless link 705.

Figure 8:
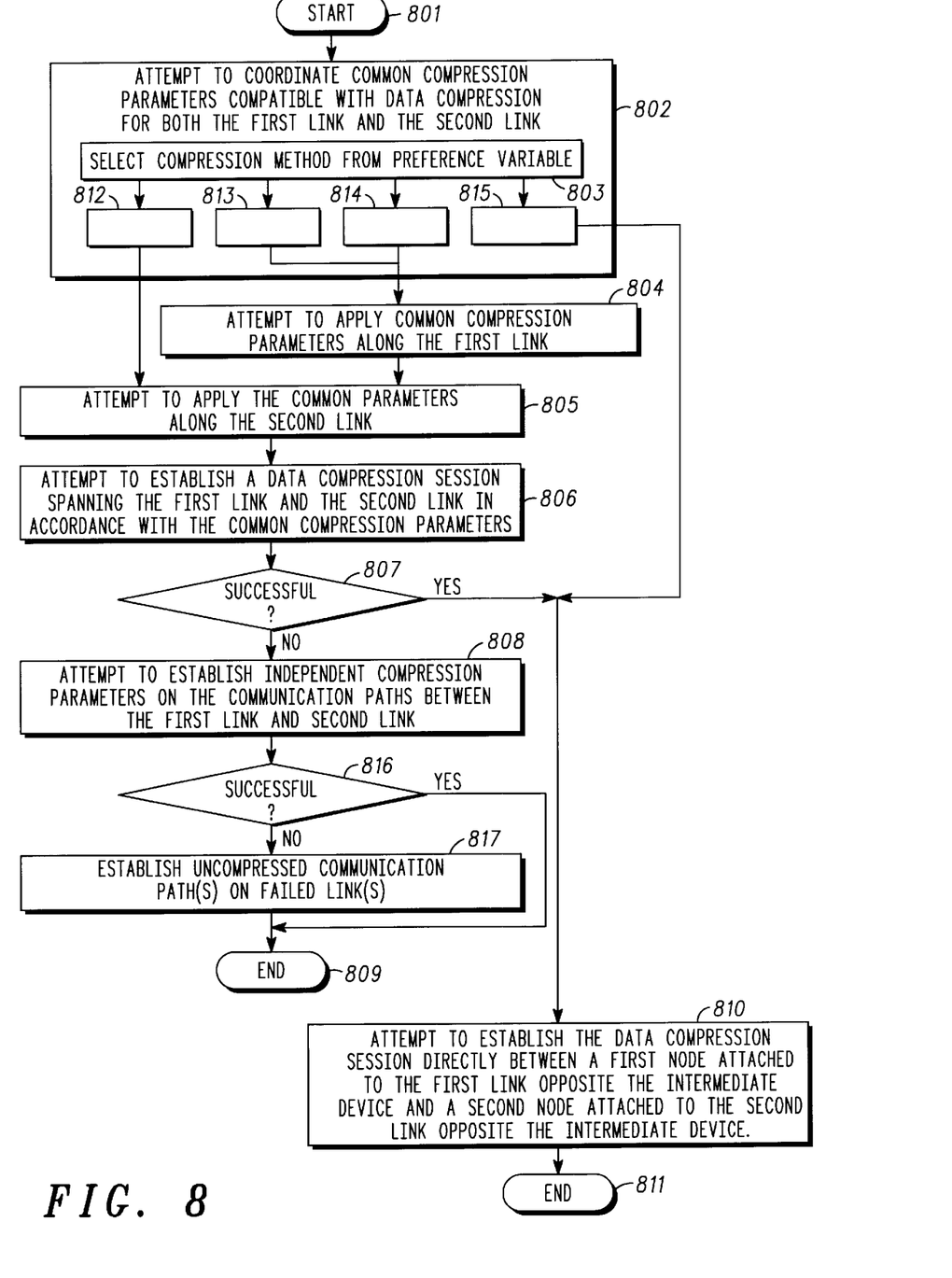
FIGS. 8 and 9 are a flow diagram illustrating a method in accordance with an embodiment of the invention.
Figure 9:
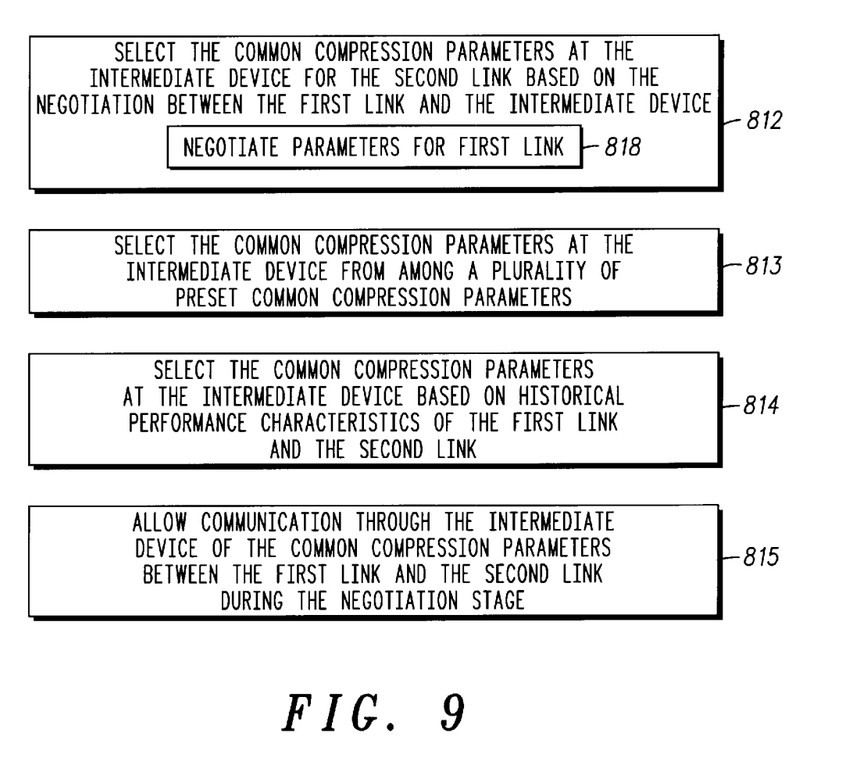

FIGS. 8 and 9 are a flow diagram illustrating a method in accordance with an embodiment of the invention. While the overall method is illustrated in FIG. 8, details of steps 812, 818, 813, 814, and 815 are illustrated in FIG. 9. In FIG. 8, the method begins in step 801. From step 801, the method continues to step 802. In step 802, an attempt is made to coordinate common compression parameters compatible with the data compression for both the first link and the second link. Step 802 may include steps 803, 812, 813, 814, and/or 815. In step 802, a compression initiation method is selected from a preference variable. Depending on the compression initiation method selected, the method may continue to step 812, step 813, step 814, or step 815.

Referring to FIG. 9 for details of steps 812, 813, 814, and 815, in step 812, the common compression parameters at the intermediate device for the second link are selected based on the negotiation between the first link and the intermediate device. Step 812 may include step 818. In step 818, parameters are negotiated for the first link. In step 813, the common compression parameters are selected at the intermediate device from among a plurality of preset common compression parameters. In step 814, the common compression parameters are selected at the intermediate device based on historical performance characteristics of the first link and the second link. In step 815, communication through the intermediate device of the common compression parameters is allowed between the first link and the second link during the negotiation stage.

Referring again to FIG. 8, if the method includes either of steps 813 or 814, the method continues from either step 813 or step 814 to step 804. In step 804, an attempt is made to apply the common compression parameters along the first link. From step 804, the method continues to step 805. If the method includes step 812, the method continues from step 812 to step 805. In step 805, an attempt is made to apply the common compression parameters along the second link. From step 805, the method continues to step 806. In step 806, an attempt is made to establish a data compression session spanning the first link and the second link in accordance with the common compression parameters.

From step 806, the method continues to step 807. In step 807, a decision is made as to whether or not the attempt of step 806 was successful. If the attempt of step 806 was not successful, the method continues to step 808. In step 808, an attempt is made to establish independent compression parameters on the communication paths between the first link and the second link. From step 808, the method continues to step 816. In step 816, a decision is made as to whether or not the attempt of step 808 was successful. If attempt of step 808 was successful, the method ends in step 809. If the attempt of step 808 was not successful, the method continues to step 817. In step 817, an uncompressed communication path is established on the failed link. If independent compression parameters failed to be established along more than one link, uncompressed communication paths are established on each failed link. From step 817, the method ends in step 809.

If a decision was made in step 807 that the attempt of step 806 was successful, the method continues to step 810. If the method includes step 815, the method continues from step 815 to step 810. In step 810, an attempt is made to establish the data compression session directly between a first node attached to the first link opposite the intermediate device and a second node attached to the second link opposite the intermediate device. From step 810, the method ends in step 811.

It should be understood that the invention, as described above, may be implemented in any practical manner. For example, the invention may be embodied in a hardware device, such as an electronic circuit, for example, a circuit constructed in a semiconductor device, or as a software program executed by a processor, or, alternatively, as some combination thereof.

Accordingly, a method and apparatus for optimizing data compression in a system comprising multiple links has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for optimizing data compression in a wireless digital access system wherein a wireless link is associated with a mobile station and a landline link is associated with a landline modem, wherein the wireless link and landline link are joined by an intermediate device and utilize a same data compression scheme, the method comprising the steps of:

the mobile station and landline modem attempting to coordinate common compression parameters from among data compression parameters, which common compression parameters are associated with the same data compression scheme and are supported by the mobile station and the landline modem;

attempting to establish a data compression session spanning the wireless link and the landline link by attempting to apply the common compression parameters to at least the wireless link; and when application of the common compression parameters to the at least the wireless link is successful, establishing the data compression session by selecting the common compression parameters at the intermediate device.

2. The method of claim 1 wherein the wireless link is a CDMA wireless link.

3. The method of claim 1 further comprising the step of:

when the step of attempting to apply the common compression parameters along the wireless link is unsuccessful, establishing different compression parameters along the wireless link.

4. The method of claim 3 wherein the wireless link is a CDMA wireless link.

5. The method of claim 1 further comprising the step of:

when the step of attempting to apply the common parameters along the wireless link is unsuccessful, establishing uncompressed communication along the wireless link.

6. The method of claim 5 wherein the wireless link is a CMDA wireless link.

7. The method of claim 1 wherein the step of selecting the common compression parameters at the intermediate device further comprises the step of:

selecting the common compression parameters at the intermediate device from among a plurality of preset common compression parameters.

8. The method of claim 7 wherein the step of selecting the common compression parameters at the intermediate device further comprises the step of:

selecting the common compression parameters at the intermediate device based on historical performance characteristics of the first link and the second link.

9. The method of claim 1 further comprising the step of:

when the step of attempting to coordinate the common compression parameters is unsuccessful, having the intermediate device intervene.

10. The method of claim 1 further comprising the step of:

when the step of attempting to establish the data compression session is unsuccessful, having the intermediate device intervene to establish at least one data compression session spanning at least one of the wireless link and the landline link.

11. The method of claim 1 wherein the common compression parameters are V.42 bis compression parameters.

12. A wireless digital access system for optimizing data compression, the system comprising:

a wireless link is associated with a mobile station and a landline link is associated with a landline modem, wherein the wireless link and landline link are joined by an intermediate device and utilize a same data compression scheme;

the mobile station and landline modem attempt to coordinate common compression parameters from among data compression parameters, which common compression parameters are associated with the same data compression scheme and are supported by the mobile station and the landline modem;

the mobile station and landline modem attempt to establish a data compression session spanning the wireless link and the landline link by attempting to apply the common compression parameters to at least the wireless link; and when application of the common compression parameters by the mobile station and landline modem to the at least the wireless link is successful, establishing the data compression session by selecting the common compression parameters at the intermediate device.

13. A wireless digital access system of claim 12 wherein the wireless link is a CDMA wireless link.

14. The wireless digital access system of claim 12 wherein the intermediate device selects the common compression parameters from among a plurality of preset common compression parameters.

15. The wireless digital access system of claim 14 wherein the intermediate device selects the common compression parameters based on historical performance characteristics of the first link and the second link.

16. The wireless digital access system of claim 12 wherein, when coordination of the common compression parameters is unsuccessful, the intermediate device intervenes.

17. The wireless digital access system of claim 12 wherein, when establishment of the data compression session is unsuccessful, the intermediate device intervenes to establish at least one data compression session spanning at least one of the wireless link and the landline link.

18. The wireless digital access system of claim 12 wherein the common compression parameters are V.42 bis compression parameters.

19. A method for optimizing data compression in a wireless digital access system wherein a wireless link is associated with a mobile station and a landline link is associated with a landline modem, wherein the wireless link and landline link are joined by an intermediate device and utilize a same data compression scheme, the method comprising the steps of:

the mobile station and landline modem attempting to coordinate common compression parameters from among data compression parameters, which common compression parameters are associated with the same data compression scheme and are supported by the mobile station and the landline modem;

attempting to establish a data compression session spanning the landline link and the wireless link in accordance with the common compression parameters; and when the step of attempting to coordinate the common compression parameters is unsuccessful, having the intermediate device intervene in the negotiation stage.

20. A method for optimizing data compression in a wireless digital access system wherein a wireless link is associated with a mobile station and a landline link is associated with a landline modem, wherein the wireless link and landline link are joined by an intermediate device and utilize a same data compression scheme, the method comprising the steps of:

selecting, by the intermediate device, common compression parameters from among data compression parameters, which common compression parameters are associated with the same data compression scheme and are based on at least one of preset parameters and historical performance of the landline link and the wireless link; and attempting to establish a data compression session spanning the landline link and the wireless link in accordance with the common compression parameters.

\* \* \* \* \*